United States Patent [19]

Hayashi et al.

[11] Patent Number: 4,564,847
[45] Date of Patent: Jan. 14, 1986

[54] IMAGE RECORDING ARRANGEMENT

[75] Inventors: Motohiko Hayashi, Ikoma; Toshiaki Karita, Sakurai; Matahira Kotani, Nara; Hiromu Sasaki, Yamotokoriyama, all of Japan

[73] Assignee: Sharp Kabushiki Kaisha, Osaka, Japan

[21] Appl. No.: 608,405

[22] Filed: May 9, 1984

Related U.S. Application Data

[62] Division of Ser. No. 434,000, Oct. 13, 1982, Pat. No. 4,491,853.

[30] Foreign Application Priority Data

Oct. 19, 1981 [JP] Japan ................ 56-167602
Oct. 19, 1981 [JP] Japan ................ 56-167603
Oct. 19, 1981 [JP] Japan ................ 56-167604
Oct. 19, 1981 [JP] Japan ................ 56-167605

[51] Int. Cl.$^4$ ............................................. G01D 15/10
[52] U.S. Cl. ................................. 346/76 PH; 400/120
[58] Field of Search ............... 400/120, 545, 546, 555; 346/76 R, 76 PH, 75; 219/216, 216 PH; 355/14 SH; 364/519

[56] References Cited

U.S. PATENT DOCUMENTS 4,272,771 6/1981 Furukawa ............................ 346/75
4,415,908 11/1983 Sugiura ......................... 346/76 PH
4,439,777 3/1984 Aprato .......................... 346/76 PH Primary Examiner—Harold Broome
Assistant Examiner—A. Evans
Attorney, Agent, or Firm—Birch, Stewart, Kolasch & Birch

[57] ABSTRACT

The disclosure is directed to an image recording arrangement for use in facsimile equipment and the like, adapted to effect an image recording at a rough density for standard information and an image recording at high density for fine information at a density at least two times that of the rough density. The recording arrangement includes a recording head having a dot density sufficient to resolve the high density so that, during the recording at the rough density, one bit of the recording information corresponds to at least two dots of the recording head.

10 Claims, 10 Drawing Figures

IMAGE RECORDING ARRANGEMENT

This application is a divisional of copending application Ser. No. 434,000, filed on Oct. 13, 1982, now U.S. Pat. No. 4,491,853.

BACKGROUND OF THE INVENTION

The present invention generally relates to a recording arrangement and more particularly, to an image recording arrangement effectively applied to a recording arrangement for facsimile equipment, a line printer or the like.

By way of example, in a recording arrangement for facsimile equipment and the like, sub-scanning densities (standard line densities in a vertical direction) are determined at 3.85 dots/mm and 7.7 dots/mm, and therefore, in the facsimile equipment in general, the sub-scanning density is fixed to either of the densities referred to above (normally to 3.85 dots/mm).

Accordingly, in the conventional arrangements, the recording density is undesirably limited, with a consequent inconvenience that an original document, etc. can not be transmitted at a high density by the ordinary equipment as described above.

Meanwhile, in the known image recording arrangement as described above, there is provided a recording head in which a plurality of dots (i.e. a plurality of recording lines) are arranged in a vertical direction so as to subject said recording head to main scanning in a horizontal direction intersecting at right angles with a feeding direction of a recording paper, and also, to subscanning in the vertical direction which is equivalent to the direction of feeding the recording paper and the direction for arranging the dots.

In the control of the sub-scanning direction as described above uneven or irregular recording takes place, even when a slight deviation is present in the pitch for feeding the recording paper. It has been difficult to completely eliminate such deviation in the paper feeding pitch from the viewpoint of mechanisms employed, and thus, some countermeasures have been required for compensating the inconvenience as described above.

Moreover, in the known image recording arrangement as described above, since the highly accurate recording density, for example, at 7.7 dots/mm is required in some cases, light weight of a recording means and stable running for the main scanning etc. have also been strongly demanded.

Furthermore, in the conventional image recording arrangement of a thermal head type, there is a non-uniformity in temperature rise of heating members or resistors for the thermal head, i.e. a difference in the time for the temperature rise between the heating members at dot positions where recording data are continuously present, and at other dot positions where recording data are intermittently present, thus also resulting in uneven depth of shade in the recording.

OBJECTS AND SUMMARY OF THE INVENTION

Accordingly, an essential object of the present invention is to provide an image recording arrangement capable of recording at any recording density, which is so arranged that, recording elements (approximately 0.13 mm/dot) which correspond to the sub-scanning density at 7.7 dots/mm are longitudinally arranged as a recording system, so that recording at the high density (i.e. at 7.7 dots/mm), and also recording at the low or rough density (i.e. at sub-scanning density of 3.85 dots/mm) which records two dots of said recording elements as one block may be effected.

Another important object of the present invention is to provide an image recording arrangement of the above described type which is equipped with a means for correcting irregular pitch for the sub-scanning lines in a vertical direction corresponding to a recording paper feeding direction, and which is so arranged that, as the irregular pitch correcting means for the sub-scanning lines, the recording position for a line at the lowermost stage recorded by sweeping the recording head in a horizontal direction and the recording position for a line at the uppermost stage recorded by a subsequent sweeping of said recording head are adapted to overlap each other so as to absorb the irregularity of the pitch.

A further object of the present invention is to provide an image recording arrangement of the above described type which is capable of achieving a stable operation of a recording head with a light weight carriage through improved structures for recording means, with a simultaneous improvement in repairing, etc. of such structures, and which is arranged so that, a circuit board having a driving circuit for the recording head is provided on a carriage means mounted with the recording head for the main scanning, and the circuit board is connected with the recording head in such a manner that, with a connector provided at the side of the circuit board, a flexible cable is led out from the recording head for connection with said connector so that said recording head is detachable with respect to said circuit board for facilitating replacement and the like of the recording head.

Still another object of the present invention is to provide an image recording arrangement of the above described type which is equipped with a means for compensating the irregularity in the depth of shade in the recording due to non-uniformity in the temperature rise of heating members in the thermal recording head. such a compensation means is arranged so that besides present or existing recording data to be recorded, previous recording data preceding said existing recording data by one step is memorized for retention. The heating members corresponding to dot positions without the previous recorded data are therefor adapted to be driven for a period longer than that of the heating members corresponding to dot positions with said previous recorded data.

In accomplishing these and other objects, according to one preferred embodiment of the present invention, there is provided an image recording arrangement for use in facsimile equipment and the like adapted to effect image recording at a rough density for a standard information and image recording at a high density for fine information at a density at least two times that of the rough density, and including a recording head having a dot density sufficient to resolve the high density, so that, during the recording at the rough density, one bit of the recording information corresponds to at least two dots of the recording head.

By the arrangement as described above and other particular constructions according to the present invention as will be described hereinbelow, an improved image recording arrangement has been advantageously presented, with substantial elimination of disadvantages inherent in the conventional image recording arrangements of this kind.

BRIEF DESCRIPTION OF THE DRAWINGS

These and other objects and features of the present invention will become apparent from the following description taken in conjunction with the preferred embodiment thereof with reference to the accompanying drawings, in which.

Before the description of the present invention proceeds, it is to be noted that like parts are designated by like reference numerals throughout the accompanying drawings.

Figure 1:
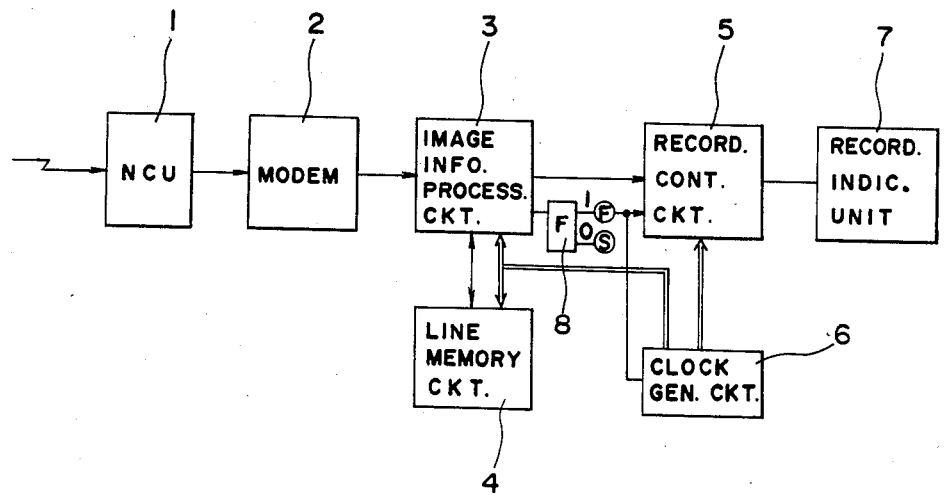
FIG. 1 is a block diagram showing an image recording section of a facsimile equipment according to one preferred embodiment of the present invention.

Referring now to the drawings, facsimile equipment provided with an image recording arrangement according to the present invention will be described hereinbelow.

DETAILED DESCRIPTION OF THE PREFERRED EMBODIMENT

In FIG. 1, there is shown a block diagram representing an image recording section as extracted from a facsimile equipment, which generally includes a circuit control unit 1 called NCU connected, through a modem 2, to an image information processing unit 3 which is coupled to a line memory 4 and a recording indication unit 7 through a flag 8 and a recording control unit 5 connected to a clock generation circuit 6 as shown.

The circuit control unit 1 controls to connect public circuits to the modem 2 which functions to convert analog information transmitted from a remote station into digital information so as to be supplied to the image information processing unit 3.

The image information processing unit 3 effects processings according to procedures as set forth by CCITT (International Telegraph and Telephone Consultative Committee) recommendations and judges whether the image information transmitted by the remote station is of a high density (referred to as a fine information hereinbelow) or of a rough density (referred to as a standard information hereinbelow) based on control information from the remote station or an operating switch of the receiving station for controlling the flag 8.

In the above case, if the image information is of the fine information, output (F) is produced from the flag 8, while on the contrary, if the image information is of the standard information, output (S) is effected therefrom.

The line memory 4 is intended to memorize the image information received, and has a capacity capable of memorizing two blocks of information equivalent to 16 lines.

Meanwhile, the recording control circuit 5 is arranged to serially apply to the recording indication unit 7, the image information of 32 bits in a longitudinal direction, according to a synchronizing signal from the clock generation circuit 6. The detailed construction of the recording control circuit 5 is specifically shown in FIG. 2, and will be described in more detail later.

The clock generation circuit 6 is adapted to supply a plurality of synchronizing signals to the image information processing unit 3 and the line memory 4 referred to earlier.

Subsequently, the processing functionings of the image information processing unit 3 will be briefly described hereinbelow.

For the transmission of the image information as set forth in CCITT recommendations, synchronization is first established with respect to the distant station prior to the transmission of the image information, and then, the image information is transmitted one line by one line, based on the synchronizing signal of 6 Hz. On the other hand, at the receiving station, the image information is successively memorized one line by one line, into the line memory 4 according to said synchronizing signal. The line memory 4 is provided with the two memory blocks having the capacity of 16 lines (1 line=1728 bits) for being used in a dual buffer system.

Meanwhile, the recording indication unit 7 described earlier effects recording, while moving a recording head (i.e. a thermal head) having recording elements of 32 bits longitudinally arranged thereon in the direction of lines (main scanning), and upon completion of the line recording, shifts a recording paper (not shown) in the longitudinal direction (sub-scanning) during returning of the recording head.

Figure 4:
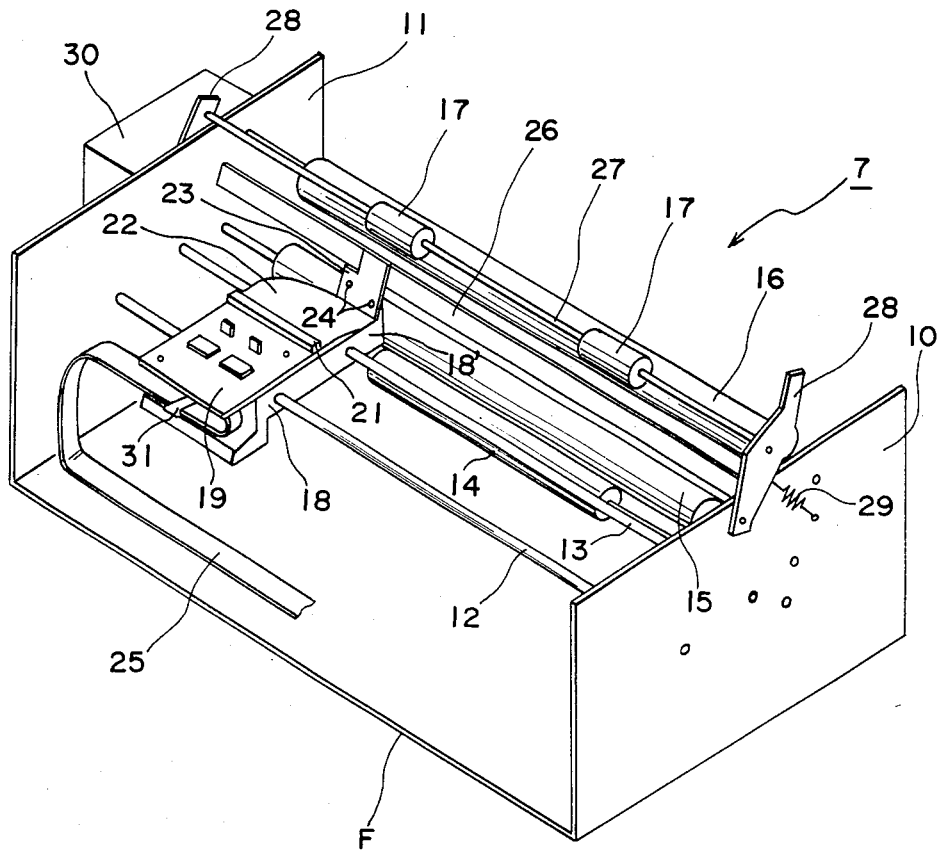
FIG. 4 is a perspective view showing a construction of a recording unit employed in the arrangement of FIG. 1.

Reference is also made to FIG. 4 showing a detailed construction of the recording indication unit 7, which generally includes a frame F having opposite side walls 10 and 11, a carriage 18 movably mounted on guide shafts 12 and 13 fixedly supported between the side walls 10 and 11 in a spaced and parallel relation to each other, and a recording head or thermal head 23 secured to the carriage 18.

The carriage 18 is associated with a pulse motor (not shown) for effecting the main scanning, and is driven for reciprocating movement on the guide shafts 12 and 13 by said pulse motor.

The pulse motor for effecting the main scanning as described above is driven by a main scanning pulse signal to be described later so as to move the carriage 18 in the going direction (i.e. rightwards in FIG. 4) at a constant speed, and is also driven by a returning pulse faster than said main scanning pulse (i.e. at a speed two times as fast) in the returning direction (i.e. leftwards in FIG. 4) at a high speed.

On the carriage 18, a circuit board 19 having a driving circuit (FIG. 3) for the thermal head 23 is mounted, while said thermal head 23 is fixed to an inclined raised portion 18' formed at the forward end of the carriage 18 by securing screws 24. The thermal head 23 is connected to the circuit board 19 by a flexible cable 22 through a connector 21. By the above arrangement, the thermal head 23 may be readily detached from the carriage 18 by removing the screws 24 and disengaging the flexible cable 22 from the connector 21. In addition, the circuit board 19 is connected to the recording control circuit 5 through a flat cable 25.

The flat cable 25 as described above has a flexibility, and is connected to the circuit board 19 after being once secured to the carriage 18 by a fixing piece 31. The number of signal lines in this flat cable 25 should preferably be as small as possible for a stable running at a constant speed of the carriage 18. Accordingly, the driving signal is serially supplied to the driving circuit of the circuit board 19 for the carriage 18, and subjected to parallel conversion by the circuit of the circuit board 19 so as to be applied to the thermal head 23. The arrangement as described above will become more apparent from the circuit construction in FIG. 3 to be described later.

The recording indication unit 7 as shown in FIG. 4 further includes a back plate 26 secured to the side walls 10 and 11 in a position confronting the thermal head 23, recording paper guide rollers 15 and 16 rotatably supported by the side walls 10 and 11 of the frame F and each connected at its one end, to a sub-scanning pulse motor (not shown) through a transmission mechanism 30 for shifting the recording paper upwardly in FIG. 4. For this purpose, a rotatable pressure roller 14 is held in pressure contact with the roller 15, while there are provided a pair of pressure rollers 17 rotatably mounted in a spaced relation from each other, on a shaft 27 which is supported by lever members 28 respectively, pivotally connected to the side walls 10 and 11 and normally urged in a direction towards the roller 16 by springs 29 connected between said lever members 28 and the corresponding side walls 10 and 11, so that said pressure rollers 17 are normally held in pressure contact with the roller 16 and may be moved in a direction away from said roller 16 during passing of the recording paper therebetween.

Accordingly, the leading edge of the recording paper drawn out from a roll paper (not shown) provided at the rear portion of the recording indication unit 7 is held between the rollers 15 and 14, and then, passes between the back plate 26 and the thermal head 23 so as to be fed out, while being held between the rollers 16 and 17.

The construction of the thermal head 23 as described above is more clearly shown in FIG. 5.

Figure 5:
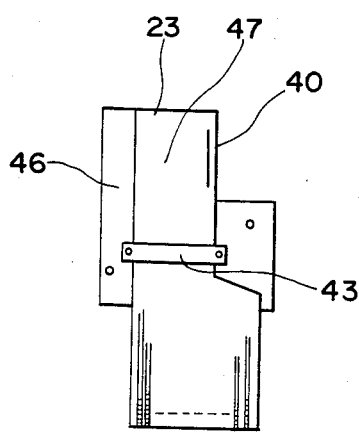
FIG. 5 is a top plan view showing on an enlarged scale, a specific construction of a recording head employed in the recording unit of FIG. 4.
Figure 6:
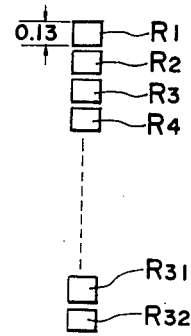
FIG. 6 is a diagram showing one example of a disposition of resistors for the recording head of FIG. 5.

In FIG. 5, the thermal head 23 includes a substrate 46 (a heat radiating member), a thermal chip 47 bonded onto said substrate 46, and heating members 40 provided at the left side of the thermal chip 47 and including resistors R1, R2, ..., and R32 arranged, for example, as shown in FIG. 6 at intervals of approximately 0.13 mm for constituting 32 dot construction corresponding to the recording for the high density.

The other ends of the heating members 40 (i.e. the resistors R1, R2, ..., and R32) are led out to one side edge of the thermal chip 47 as contacts, which are connected to one end of the flexible cable 22 by the fixing member 43.

Figure 3:
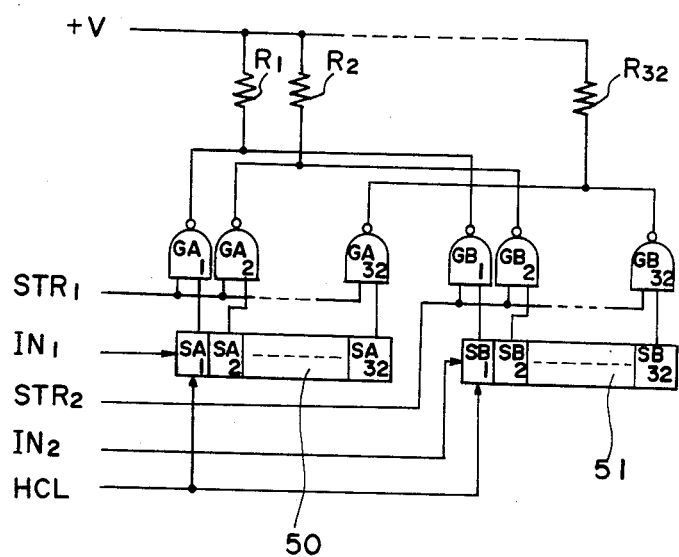
FIG. 3 is an electrical block circuit diagram showing a driving circuit of a recording head.

Referring particularly to FIG. 3, the driving circuit for the thermal head mentioned earlier which is provided in the circuit board 19 mounted on the carriage 18 will be described hereinbelow.

One end of each of the resistors R1, R2, ..., and R32 for the heating members 40 is applied with a power source voltage $+V$, while the other ends thereof are respectively connected to the driving circuit formed into a pair of A and B groups.

The group A of the driving circuit as described above includes NAND gates GA1, GA2, ..., and GA32 each connected, at its one input, to a corresponding bit output of a shift register 50, and applied, at the other input thereof, with driving pulse STR1 from the recording control circuit 5 (FIG. 1). In the shift register 50 as described above, recording data IN1 from the recording control circuit 5 are successively memorized, while being subject to shifting function by a shift clock signal HCL.

Figure 8:
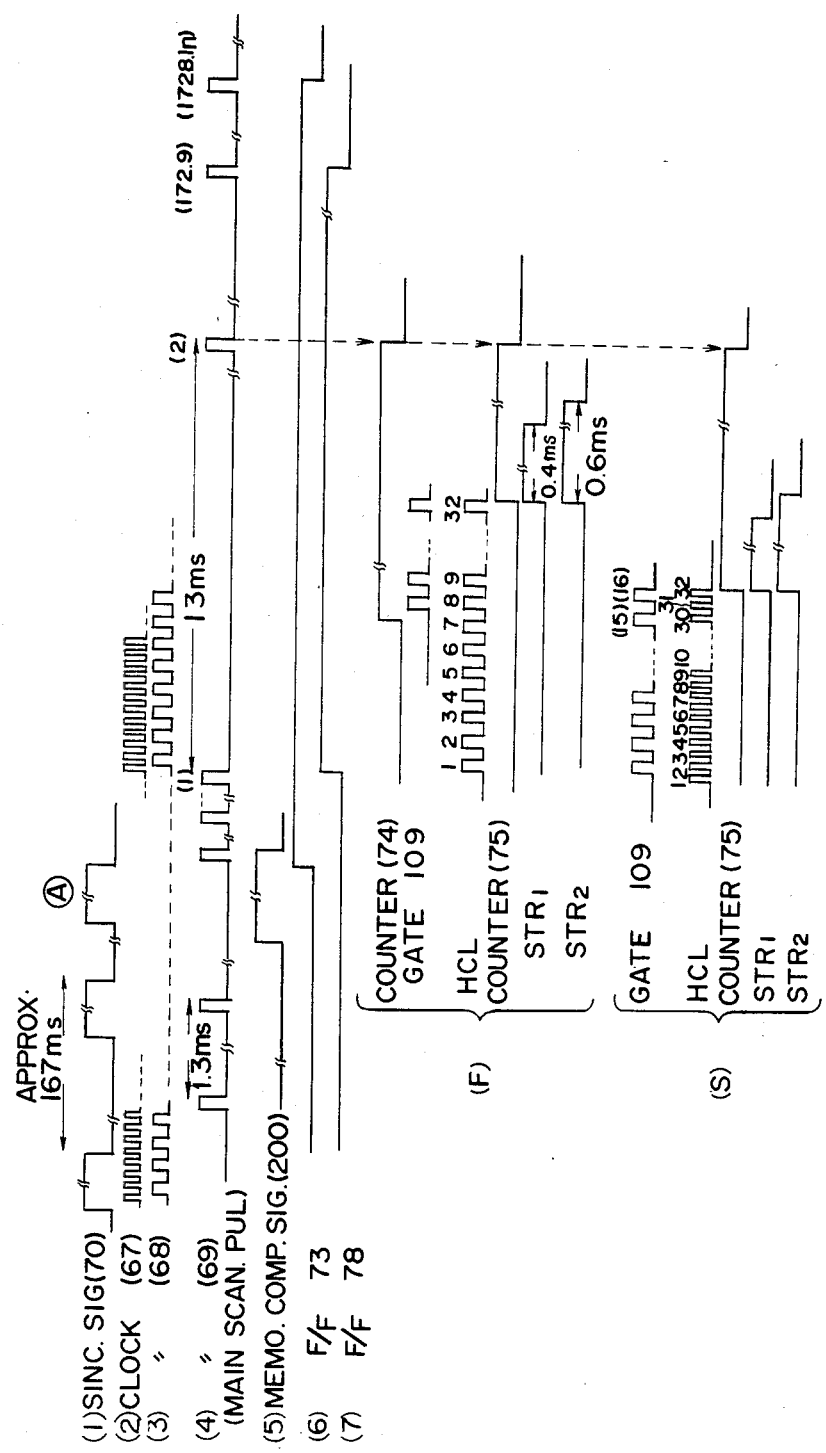
FIGS. 8, 9 and 10 are time-charts explanatory of control functions in the arrangement of FIG. 2.

On the other hand, the group B of the driving circuit includes NAND gates GB1, GB2, ..., and GB32 each connected, at its one input, to a corresponding bit output of another shift register 51, and applied, at the other input thereof, with temperature correction pulse STR2 produced from the recording control circuit 5 (FIG. 1). In the shift register 51 as described above, recording data IN2 from the recording control circuit 5 is successively memorized, while being subjected to a shifting function by the shift clock signal HCL. The driving pulse STR1 has a pulse width of approximately 0.4 ms, while the driving pulse STR2 has a pulse width of about 0.6 ms (FIG. 8).

The correction circuit constituted by the group B as described above is intended to achieve a predetermined depth of shade in the recording by maintaining temperature of the heating members constant, since the time required for the temperature rise of the heating members is different according to presence or absence of the previous data, due to the thermal or heat sensitive recording.

Referring back to FIG. 2, the specific constructions of the recording control circuit 5 clearly representing the characteristic structure of the present invention will be described in detail hereinbelow.

Figure 2:
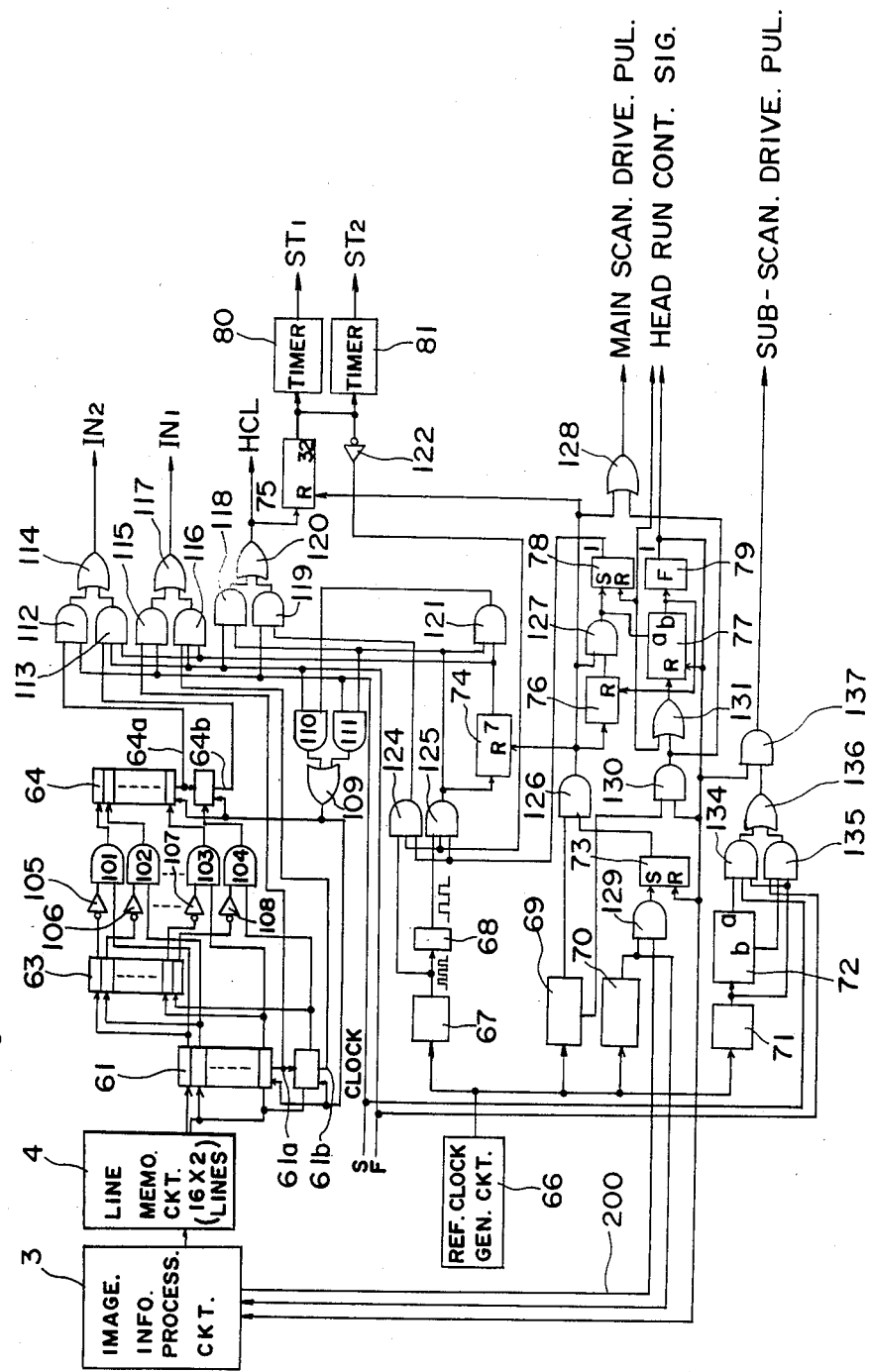
FIG. 2 is an electrical block circuit diagram illustrating a specific construction of a recording control circuit employed in the arrangement of FIG. 1.

In the circuit arrangement of FIG. 2, there is provided a shift register 61 constituted by 17 bits and having an output terminal 61a for the 16th bit and another output terminal 61b for the 17th bit, and coupled to the line memory circuit 4 described earlier.

To the shift register 61, recording data for one column composed of 16 bits of the line memory circuit 4 are successively applied for memorization, while the data from said shift register 61 is transferred to a buffer register 63 of 17 bits coupled to said shift register 61 as shown.

The shift register 61 connected to an OR gate 109 also produces shift outputs from its output terminals 61a and 61b according to clock signal fed from said OR gate 109. In the 16th bit and 17th bit of said shift register 61, the same data from the line memory circuit 4 are memorized.

One input of each of AND gates 101, 102, 103 and 104 coupled to the shift register 61 and buffer register 63 is connected to the output for each bit of said shift register 61, while, to the other inputs of said AND gates 101 to 104, the respective bit outputs of the buffer register 63 which memorizes the recording date of one column before, are applied through corresponding inverters 105, 106, 107 and 108.

The outputs of said AND gates 101 to 104 are coupled to another shift register 64 composed of 17 bits so as to be introduced and memorized in the corresponding bits of said shift register 64.

Accordingly, in the shift register 64, the recording data of one column before are memorized. In other words, in the case where the output from the buffer register 63 is "0", with the data of the shift register 61 being "1", "1" is memorized for the temperature correction data. The above shift register 64 has the construction similar to that of the shift register 61, and produces shift outputs from its output terminals 64a and 64b according to clock signal fed from the OR gate 109.

The shift output from the output terminal 61b of the shift register 61 is applied to an AND gate 116 which becomes effective at the fine information (F) of the flag 8 (FIG. 1). The output from said AND gate 116 is derived as the output IN1 through an OR gate 117 connected thereto, and is introduced into the shift register 50 (FIG. 3) through the flat cable 25 as shown in FIG. 4.

On the other hand, the shift output 64b of the shift register 64 is applied to an AND gate 113 connected thereto and rendered to be effective at the fine information (F) of the flag 8 of FIG. 1, while the shift output 64a of said shift register 64 is impressed to an AND gate 112 rendered to be effective at the standard information (S) of the flag 8, and outputs of these AND gates 113 and 112 are derived as the output IN2 through an OR gate 114 connected thereto so as to be introduced into the shift register 51 (FIG. 3) through the flat cable 25.

The recording control circuit 5 as shown in FIG. 2 further includes a reference clock generation circuit 66 which is connected to a frequency divider 67 for applying signal to the shift registers 61, 64, 50 and 51, another frequency divider 69 which generates driving pulses for the pulse motor intended to drive the carriage 18 (FIG. 4) in the main scanning direction, still another frequency divider 71 which produces driving pulses for the pulse motor arranged to move the recording paper in the upward subscanning direction, and a further frequency divider 70 which generates synchronizing signal for transmission through each line.

The frequency dividers 67, 69, 70 and 71 are constituted by counters, in which the frequency divider 67 is further coupled to a flip-flop 68 of 1 bit for producing pulses of double-period.

Meanwhile, the frequency divider 69 for the main scanning of the carriage 18 has an output for feeding the pulse of about 1.3 ms width to an AND gate 126 connected thereto, and another output for a feeding periodic pulse approximately ½ of the above to an AND gate 130 coupled therewith, with the latter pulse serving as the driving pulse for the pulse motor during the returning of the carriage 18.

The frequency divider 71 is connected to a counter 72 provided with a terminal "a" which produces "0" upon counting 32 pulses, and a terminal "b" which produces "0" upon counting 16 pulses.

The frequency divider 70 for producing the synchronizing signal for the transmission, steadily generates the synchronizing signal of 6 Hz for establishing synchronization between the transmitting and receiving stations before transmission of the image.

A heptad counter 74 or scale-of-7 counter is connected to the output of an AND gate 125 which is coupled to a timer 81 through an inverter 122, and also, to a flip-flop 78 through a scale-of-n counter 76 and an AND gate 127, and is arranged to count the pulses (i.e. the output of the flip-flop 68) from the AND gate 125 rendered to be effective by the output "1" from the inverter 122 and the set output of the flip-flop 78.

Upon counting of seven, the above counter 74 continues to output "1" until it is reset by the AND gate 126 connected thereto, and when this counter 74 produces "1", an AND gate 121, the AND gate 113, and an AND gate 116 coupled to said counter 74 are rendered to be effective.

The output from the above AND gate 121 is fed to an AND gate 110 to be rendered effective during the fine information so as to develop clock signal for shift-function from the OR gate 109. Meanwhile, the pulses from the AND gate 125 are supplied to an AND gate 111 connected to said gate 125 and rendered to be effective during the fine information, and to an AND gate 118 also connected to the gate 125 and rendered effective during the fine information. The output of the AND gate 111 causes a shift clock signal to be produced from the OR gate 109, while the output of the AND gate 118 is produced as the shift clock HCL of the shift registers 50 and 51 shown in FIG. 3 through an OR gate 120 connected to the AND gates 118 and 119.

On the other hand, the pulse of an AND gate 124 is connected to the AND gate 125 and the flip-flop 68, i.e. the pulse having a period ½ that of the pulse of the flip-flop 68 which is output as the shift clock HCL through the AND gate 119 which becomes effective during the standard information.

Another scale-of-32 counter 75 is connected to the OR gate 120 and the AND gate 126 and also, to a first timer 80 and the second timer 81, and is arranged to start said first timer 80 (0.4 ms) which produces the driving pulse STR1 and said second timer 81 (0.6 ms) which produces the correction pulse STR2, by developing the output "1" upon counting of the 32nd pulse. These pulses STR1 and STR2 are supplied to the driving circuit of FIG. 3 through the flat cable 25 (FIG. 4).

Moreover, although not particularly shown, the output of the above counter 75 also serves as a starting signal for transferring the data equivalent to one column of the line memory 4 into the shift register 61.

The output of the frequency divider 70 which generates the synchronizing signal (6 Hz) for the transmission as described earlier is applied to one input terminal of an AND gate 129 connected thereto, while, to the other input of said gate 129, a signal 200 which is developed upon completion of memorizing of 16 lines, is applied from the image information processing circuit 3. A flip-flop 73 coupled to the AND gate 129 is arranged to be set by the output of said gate 129. The signal 200 should preferably be output before the 17th signal of the synchronizing signal.

The set output of the above flip-flop 73 renders the AND gate 126 effective, and causes the main scanning pulses from the frequency divider 69 to be produced, and resets the counters 74 and 75, and simultaneously, supplies the driving pulses to the main scanning pulse motor through an OR circuit 128 coupled to said counters 74 and 75 and the AND gate 130.

Furthermore, the main scanning pulses as described above are applied to the scale-of-n counter 76 as described earlier. This counter 76 is intended to compensate for the rising of the pulse motor until it attains the constant speed, and is arranged to render the AND gate 127 effective by continuously producing the output "1" upon counting the nth pulse. The output of the AND gate 127 sets the flip-flop 78, and renders the AND gates 124 and 125 for the clock generation effective. Moreover, the output of the AND gate 127 is applied to a main scanning line counter 77 through an OR gate 131 connected to the AND gate 130.

The main scanning line counter 77 as described above is adapted to count the pulses, and has a terminal a which outputs "1" upon counting of 1728 (equivalent to a recording width for A4 size), and another terminal 6 which produces "1" upon counting 1728+n (approximately equal to the n of the scale-of-n counter 76 as described earlier), with these outputs continuously producing "1".

The output of the terminal a as described above continues to reset the flip-flop 78, and also, serves as a stopping control signal for the pulse motor. Meanwhile, the output of the terminal b resets the counter 76, and also, inverts a flip-flop 79 connected to the counter 77. The above flip-flop 79 serves as an indication signal for the running direction of the carriage 18 so as to indicate the displacement in the rightward direction during setting.

During rising of the set output of the above flip-flop 79, the counter 77 and the flip-flop 73 are reset, while the completion of the main scanning recording is instructed to the image information processing circuit 3, with the data transfer from the line memory 4 to the shift register 61 being suspended.

Furhtermore, the set output from the flip-flop 79 renders effective, an AND gate 137 coupled to the pulse counter 72 through an OR gate 136 and AND gates 134 and 135, and is arranged to feed the sub-scanning pulses from the AND gate 134 or 135 to the sub-scanning pulse motor.

Subsequently, control functionings of the arrangement according to the present invention (FIG. 2) will be described hereinbelow with reference to the time-charts shown in FIGS. 8, 9 and 10.

(1) Fine information

This relates to the recording at the high density, and in the first place, the flag 8 as shown in FIG. 1 is set, and the signal (F) representing the fine information is output, and then, the image information is transmitted from the transmitting station according to the synchronizing signal. The image information as described above is memorized by the amount equivalent to 16 line in the line memory 4 shown in FIG. 2.

Before transmission of the synchronizing signal (A) for the image information at the 17th line, the signal 200 is produced from the image processing circuit 3 so as to open the AND gate 129 and to set the flip-flop 73. Meanwhile, from the line memory 4, the recording date 16 bits for the first column are transferred to the shift register 61. It should be noted here that, in the above case, the same data is memorized between the 16th bit and the 17th bit.

The data introduced into the shift register 61 are first derived into the AND gates 101 to 104. At this early stage, since the buffer register 63 is in the fully reset state, the same data as those in the shift register 61 are memorized in the shift register 64. After the above functioning, the data in the shift register 61 are transferred to the shift register 63.

It is to be noted here that in FIG. 8, a numeral (1) shows the synchronizing signal as described earlier, a numeral (5) denotes the signal 200 indicating the completion of memorization and produced prior to the synchronizing signal (A), a numeral (2) shows the signal of the frequency divider 67, a numeral (3) represents the signal of the frequency divider 68, and a numeral (4) denotes the signal (main scanning pulse) of the frequency divider 69, while numerals (6) and (7) respectively show outputs of the flip-flops 73 and 78. Moreover, a region for a symbol (F) shows various waveforms during the period for the fine information, and another region for a symbol (S) represents various waveforms during the period for the standard information.

On the other hand, by the opening of the AND gate 129 as described earlier, the flip-flop 73 is set by the synchronizing signal through said gate 129, whereby the AND gate 126 is rendered to be effective.

By the above function, the main scanning pulses (at (4) in FIG. 8) are produced from the gate 126, and said main scanning pulses reset the counters 74 and 75, and also, supply the driving pulses to the main scanning pulse motor through the OR gate 128. Moreover, the main scanning pulse as described above are further supplied to the scale-of-n counter 76 so as to be counted thereby.

Upon counting of the nth pulse by the counter 76, the AND gate 127 is opened to set the flip-flop 78 for simultaneous feeding of signal to the counter 77. By the set output of the flip-flop 78, the AND gate 125 is rendered effective, and the pulses of double period from the flip-flop 68 are supplied to the counter 74 from said gate 125, while the shift clock HCL is output through the AND gate 118 and OR gate 120. The shift clock HCL as referred to above is applied to the scale-of-32 counter 75 and also, to the shift registers 50 and 51 as shown in FIG. 3.

Meanwhile, the counter 74 referred to earlier is producing a "0" output up to counting of the 7th pulse, with the AND gates 113 and 116 being consequently kept closed, and thus, the recording data IN1 and the correction data IN2 are not output. Therefore, the shift registers 50 and 51 are subjected to 7 bit "0" shift (at SA1 in FIG. 9).

On the other hand, when the counter 74 has counted the 7th pulse, the AND gate 121 is rendered effective, while simultaneously, the AND gates 113 and 116 are also rendered effective. By the opening of the AND gate 121, pulses from the 8th pulse of the shift clock HCL are supplied to the shift registers 61 and 64 through the AND gate 110 and OR gate 109. Meanwhile, the output from the terminal 64b of the shift register 64 and the output from the terminal 61b of the shift register 61 are respectively applied to the AND gates 113 and 116 so as to be further fed to the shift registers 51 and 50 as the recording data IN1 and the correcting data IN2.

Accordingly, to the shift registers 50 and 51, recording data and correction data are successively memorized through shifting.

Through successive shifting as described above, upon counting the 32nd pulse by the counter 75, the output "1" is produced.

Figure 9:
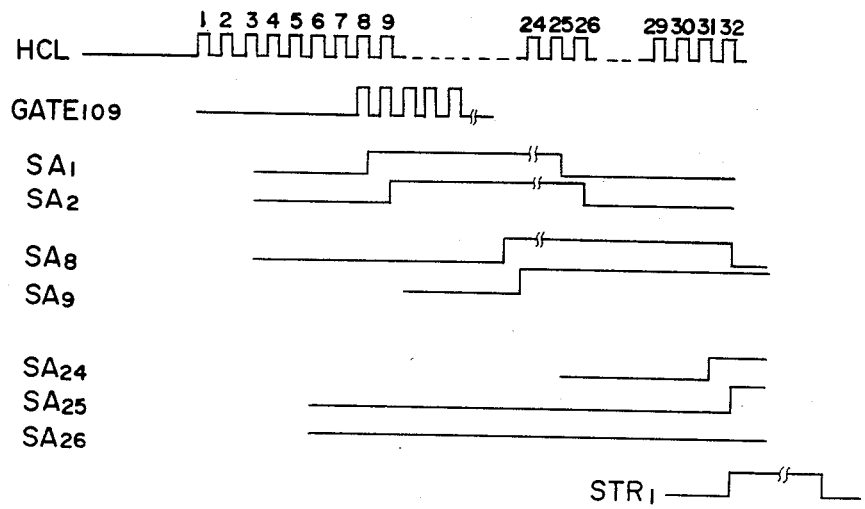

In the above case, as is clear from FIG. 9, in the shift register 50 or 51, 17 bits of signals SA9 to SA25 are of "1". In other words, recording data of 17 lines (17 dots) are set with respect to the data of 16 lines (16 dots).

The signals of SA1 to SA26 in FIG. 9 represent the state of respective bits of the shift register 50 in FIG. 3, and in this example, there is shown the state where the data are all black, with outputs of "1".

Simultaneously with the closing of the AND gates 124 and 125 by the "1" output of the counter 75, the timers 80 and 81 are driven and the pulse STR1 is supplied to the NAND gates GA to GA32, while the pulse STR2 is fed to the NAND gates GB1 to GB32. While these pulses STR1 and STR2 are supplied, the respective gates are opened, with the heating members, i.e. resistors R1 to R32 being energized for the recording.

In the above case, since the pulse STR2 having a width longer than that of the pulse STR1 is applied to the NAND gates GB1 to GB32, the bit corresponding to the memorization of "1" by the shift register 51 is energized longer for the correction.

Meanwhile, the output "1" of the counter 75 is supplied to the processing circuit 3 for the transfer of the subsequent column to the shift register 61, with the above functioning being repeated for each main scanning pulse.

Upon completion of all the recording for the main scanning lines through repetition of the foregoing function, "1" is produced from the terminal a of the counter 77 to reset the flip-flop 78. Accordingly, the AND gates 124 and 125 are closed, while the main scanning pulse motor is controlled for stopping by the output of the terminal a. Thereafter, upon producing "1" output from the terminal b of the counter 77, the counter 76 is reset, with the flip-flop 79 being inverted for setting, and by the set output, the flip-flop 73 is reset to close the AND gate 126, with the output for the main scanning pulses being suspended.

On the other hand, the AND gates 130 and 137 are rendered effective by the set output of the flip-flop 79, and through opening of the AND gate 130, a return pulse having a period shorter than that of the main scanning pulse produced from the frequency divider 69 is applied to the main scanning pulse motor so as to return the carriage at high speed.

Meanwhile, by the opening of the gate 137, the sub-scanning pulse motor feeds the recorded paper by the amount equivalent to 16 lines.

It should be noted here that, since the recording is for 17 lines, the recording position of the leading line for the subsequent recording of 16 lines overlaps that of the 17th line so as to correct the irregularity in the pitch of the sub-scanning line by overlapping the recording positions.

It should also be noted that, as is clear from FIG. 9, during the fine information described so far, 16 dots (17 dots) at the central portion of 32 bits, i.e. the signals SA25 to SA9 are employed, owing to the fact that stable images are obtained thereby, since the central portion of the recording head is held in close contact with the recording paper, and that, in the case of a facsimile equipment provided with an image reading unit also, an optical system for reading is simultaneously mounted on a carriage having the recording head, and owing to the fact that the same synchronizing signal is employed for this purpose, during reading of a high density image, a lens for the optical system may provide a stable output since the central portion becomes the flattest.

(2) Standard information

This relates to the recording at the low or rough density, and the flag 8 in FIG. 1 is first reset, and the signal (S) representing the standard information is produced.

The above recording at the rough density, functions approximately similar to recording at the high density (fine information), with a particular difference in that the clock signal HCL is rendered to be a clock signal having a period ½ that of the case of the fine information.

More specifically, in FIG. 2, the AND gates 111, 112, 115 and 119 are rendered to be effective, and the clock signal at ½ period produced from the AND gate 124 is fed to the shift registers 50 and 51 as the signal HCL through the OR gate 120.

Meanwhile, the clock signal having a period two times that of the shift clock signal HCL produced from the AND gate 125 is applied to the shift registers 61 and 64 from the AND gate 111 through the OR gate 109.

The 16th bit output from the terminal 61a of the shift register 61 is shift-input to the shift register 50 through the AND gate 115 and OR gate 117 in the form of the signal IN1, based on the clock signal.

Similarly, the 16th bit output from the terminal 64a of the shift register 64 is shift-input to the shift register 51 through the AND gate 112 and OR gate 114 as the signal IN2, based on the clock signal.

In the manner as described above, in the clock signal of the shift registers 50 and 51, since two pulses are applied with respect to one pulse of the clock signal of the shift registers 61 and 64, data of two bits with respect to one bit of the shift registers 61 and 64 are memorized in the shift registers 50 and 51.

Figure 10:
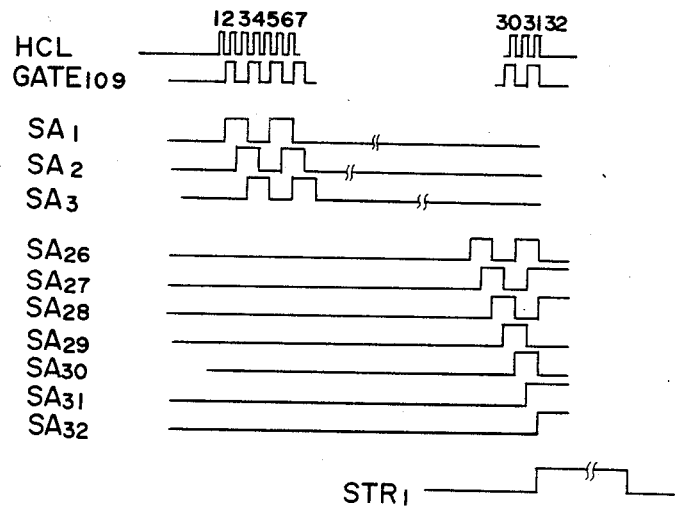

FIG. 10 shows the state of the respective bits for the shift register 50 in FIG. 3 under the above state, in which only the 14 and 16 of the image information are of "1".

Upon counting of the 32nd pulse by the counter 75 in FIG. 2, the signals SA27 and SA28, and SA31 and SA32 are rendered to be "1" as shown in FIG. 10.

In the manner as described in the foregoing, images at the rough density may be recorded by the recording head having the bit disposition for the high density.

Since other functions are generally similar to those in the recording for the fine information, detailed description thereof is abbreviated for brevity.

(3) Other embodiments

The arrangement according to the present invention as described so far may further be modified as follows.

Figure 7:
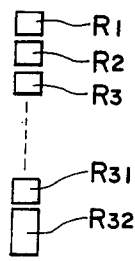
FIG. 7 is a diagram similar to FIG. 6, which particularly shows a modification thereof.

In the recording for the fine information as described in the foregoing, although the 17th bit is added to the last bit (16th bit) for overlapping with the leading line of the subsequent lines, it may be so arranged, on the contrary, that, one bit is added before the leading bit for overlapping with the 16th bit of the immediately previous line. Moreover, for the last one (or the leading one) of the resistors R1, R2, . . . , and R32 for the thermal head, a resistor (i.e. heating member) having a size 1.5 to 2 times that of the other dots may be formed as shown in FIG. 7.

Meanwhile, in the foregoing embodiments, although "1" is recorded only for the bits to be newly recorded, through comparison with the data in the column at one step before, the arrangement may be so modified that, "1" is memorized only for the bits already recorded, and the output pulse of the timer 80 is rendered to be 0.6 ms, with the output pulse of the timer 81 being made shorter than the above at 0.4 ms.

Similarly, it may also be so arranged that, with sensors for detecting the temperatures of the resistor being provided on the timers 80 and 81, the pulse widths of the pulses STR1 and STR2 are altered according to the temperatures.

As is clear from the foregoing description, according to the image recording arrangement of the present invention intended to effect the image recording at the rough density (standard information), and the image recording at the high density (fine information) having a density at least two times that of the rough density, the construction is so made that, with the recording head having the dot density sufficient to resolve the high density being provided, one bit of the recording information corresponds to at least two dots of the recording head during recording at the rough density, and thus, it has been made possible to effect recording at any density so as to eliminate problems inherent in the conventional arrangements of fixed density type.

Hereinbelow, the characteristic constructions of the embodiments according to the present invention will be summarized.

(i) In an image recording arrangement which includes means for recording images at a rough density (standard information) and means for recording images at a high density (fine information) having density of at least two times that of said rough density, there is further provided a recording head having a dot density sufficient to resolve the high density, so that, during the recording at the rough density, one bit of the recording information corresponds to at least two dots of said recording head for the recording.

(ii) In the arrangement of the above item (i), there are further provided a first memory means for accommodating recording data having a capacity no more than half that of said recording head, and a second memory means for accommodating the recording data having a capacity corresponding to each dot of said recording head for transfer of the data from said first memory means to said second memory means through shift functioning by clock signal of more than two times.

(iii) In the arrangement of the above item (i), it is so arranged that during recording at the rough density, all the dots of said recording head are utilized, while during the recording at the high density, only the central portion of said recording head is used.

Moreover, in the image recording apparatus of the present invention as described so far, in order to correct the irregularity in the pitch of the sub-scanning lines in the vertical direction which is the recording paper feeding direction, the recording position of the line at the lowermost stage recorded by sweeping the recording head one time in the direction of the main scanning is adapted to be overlapped with the recording position of the line at the uppermost stage to be recorded by the subsequent sweeping of said recording head in the main scanning direction for absorbing the irregularity in the pitch in the sub-scanning direction so as to provide clear and definite images without any unevenness of recording.

The above constructional features of the present invention may be summarized as follows.

(iv) In an image recording arrangement which includes a recording head having a plurality of dots (for a plurality of recording lines) arranged in row in a vertical direction, means for subjecting said recording head to a main scanning in a lateral direction intersecting at right angles with a feeding direction of a recording paper, and means for subjecting said recording head to a sub-scanning in said vertical direction which is equivalent to said feeding direction of the recording paper and said direction of arranging said dots of said recording head, it is so arranged that a recording position of a line at the lowermost stage recorded by sweeping of the recording head one time in the main scanning direction is adapted to be overlapped with a recording position of a line at the upper most stage to be recorded by a subsequent sweeping of said recording head once more in the main scanning direction for recoding, with said main scanning and the sub-scanning being successively effected.

(v) In the arrangement of the above item (iv), the line at the lowermost stage in a preceding sweeping recording in the main scanning direction or the line at the uppermost stage in a succeeding sweeping recording in the main scanning direction is adapted to be formed larger than other recording line for recording by overlapping.

(vi) In the arrangement of the above item (v), two dots of said recording head are employed for forming said line larger than the other recording lines, with the same data being applied to said two dots.

(vii) In the arrangement of the above item (v), a first or last dot of the row of said dots for said recording head is formed to be larger in size than other dots for forming said line larger than said other recording lines.

Furthermore, the image recording apparatus of the present invention as described in the foregoing includes a carriage means mounted with the recording head and arranged to reciprocate in the main scanning direction, with said recording head being provided at the forward end of said carriage means in the position confronting the recording paper, a circuit board mounted on said carriage means and provided with a driving circuit of said recording head and a connector means as its one edge, a flexible cable derived from said recording head so as to be detachably connected to said connector, and a flat cable for connecting said circuit board and the image processing means, and thus, the weight of the recording head is reduced for stable running of the carriage, while the recording head may be readily disengaged from the carriage for the repairing or the like, with consequent simplification of the replacement and the like of the recording heads. Moreover, since the means for compensating the irregularity in the depth of shade for the recording is provided, generation of uneven depth of shade in the recorded images due to non-uniformity in temperatures of heating members as in the conventional thermal head recording arrangements has been advantageously eliminated for providing images at high qualities.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. An image recording system comprising:
means for supplying information to be recorded;
recording head means for recording a predetermined number of bits along a record line, said recording head means including an array of colinearly aligned elements of a number one greater than needed to scan said predetermined number of bits, and an adjacent pair of elements at one end of said array having a single bit applied thereto;
means for feeding paper in a first direction aligned with said record line along a paper feed path; and
scan means for driving said recording head means transversely across said paper to scan said paper with each element of said recording head means in a single scan so as to scan a predetermined scan area of said paper having a predetermined scan width;
said means for feeding paper advancing said paper along said paper feed path a predetermined feed increment after each scan of said scan means to facilitate scanning of said paper by said recording head means in response to information supplied by said means for supplying said predetermined feed increment being slightly less than said predetermined scan width to ensure complete scanning of said paper the bit of said adjacent pair of elements at said one end overlapping the portion of an adjacent scan area.

2. The system of claim 1 wherein each scan of said paper by said recording head means overlaps at least a portion of an area scanned by an element of said recording head means in a previous scan.

3. An image recording system comprising:
   means for supplying information to be recorded;
   recording head means for recording a predetermined number of bits along a record line,
   said recording head means including an array of colinearly aligned elements having an enlarged element at one end of said array;
   means for feeding paper in a first direction aligned with said record line along a paper feed path;
   scan means for driving said recording head means transversely across said paper to scan said paper with each element of said recording head means in a single scan so as to scan a predetermined scan area of said paper having a predetermined scan width,
   said means for feeding paper advancing said paper along said paper feed path a predetermined feed increment after each scan of said scan means to facilitate scanning of said information by said recording head means in response to information supplied by said means for supplying said predetermined feed increment being slightly less than said predetermined scan width to ensure complete scanning of said paper, said enlarged element overlapping an adjacent scan.

4. An image recording system comprising:
   means for providing information to be recorded;
   recording head means for recording a predetermined number of bits along a record line, said recording head means including a recording element for each said bit along said record line;
   means for feeding paper in a first direction aligned with said record line along a paper feed path;
   scan means for driving said recording head means transversely across said paper to scan said paper with each element of said recording head means in a single scan so as to scan a predetermined scan area of said paper having a predetermined scan width, said scan means including carriage means reciprocable transversely to said paper feed path for supporting said recording head means;
   a circuit board supported by said carriage means; and
   means, responsive to said means for providing, for supplying current to said individual elements of said recording head means in accordance with said information, said means for supplying being mounted on said circuit board;
   said means for feeding paper advancing said paper along said paper feed path a predetermined feed increment after each scan of said scan means to facilitate scanning of said paper by said recording head means in response to information provided by said means for supplying, said predetermined feed increment being slightly less than said predetermined scan width to ensure complete scanning of said paper;
   said circuit board having a first connector at one edge thereof;
   frame means for supporting the remainder of said image recording system;
   said means for providing having a second connector affixed to said frame means;
   said first and second connectors being interconnected by a flat flexible cable allowing substantially unstrained movement of said carriage means.

5. The system of claim 1 wherein said system is a thermal recording system.

6. The system of claim 3 wherein said system is a thermal recording system.

7. The system of claim 4 wherein said system is a thermal recording system.

8. A thermal head recording system for recording information on a recording paper comprising:
   recording head means having a plurality of thermal recording elements provided thereon for recording a predetermined number of information bits along a record line;
   scan means for shifting said recording head means transversely across said paper to scan said paper with each element of said recording head means in a single scan so as to scan a predetermined scan area of said paper having a predetermined scan width;
   means for feeding paper in a first direction aligned with said record line along a paper feed path;
   means for supplying information to be recorded by said recording head means as a plurality of information bits corresponding to the number of thermal recording elements on said recording head means;
   means, responsive to said means for supplying, for driving each said thermal recording element, said means for driving being timed with said scan means to facilitate the uniform printing of information on said paper, said means for driving including,
   first memory means for storing said information bits received from said means from supplying to be presently recorded,
   second memory means for storing the most recent previously received information bits recorded by said recording head means therein,
   said first and second memory means having storage positions corresponding in number to the number of said plurality of thermal recording elements and being connected in a unique correspondence therewith, said first and second memory means having said information bits stored therein in binary,
   means, responsive to the contents of said first and second memory means, for applying electrical energy of a first level to said thermal elements uniquely corresponding to storage positions having a logical one stored therein in both said first and second storage means, and for applying electrical energy of a second level greater than the first level to those said thermal elements uniquely corresponding to storage positions having a logical one stored in said first memory means and a logical zero stored in said second memory means;
   said means for feeding paper advancing said paper along said paper feed path a predetermined feed increment after each scan of said scan means to facilitate scanning of said paper by said recording head means in response to information supplied by said means for supplying said predetermined feed increment being slightly less than said predetermined scan width to ensure complete scanning of said paper.

9. The system of claim 6 wherein said means for applying applies a greater pulse width to those thermal recording elements uniquely corresponding to storage positions having a logical zero stored therein in said second memory means.

10. The system of claim 9 wherein said means for applying comprises:
   third memory means for storing a logical one at positions therein which uniquely correspond to thermal elements corresponding to storage positions of said first and second memory means having a logical one stored in each;
   fourth memory means for storing a logical one at positions therein which uniquely correspond to thermal elements corresponding to storage positions having a logical one stored therein in said first means and a logical zero stored therein in said second memory means;
   first means for developing a pulse of a first width;
   second means for developing a pulse of a second width greater than the width of said pulse produced by said first means for developing; and
   enablement means for enabling the application of said pulses developed by said first means for developing to only said thermal elements having a logical one stored in the positions of said thermal memory means uniquely corresponding thereto, and for enabling the application of said pulses developed by said second means for developing to only said thermal elements having a logical one stored in the positions of said fourth memory means uniquely corresponding thereto.

* * * * *